US012584629B2

(12) United States Patent
Selvakani et al.

(10) Patent No.: US 12,584,629 B2
(45) Date of Patent: Mar. 24, 2026

(54) SYSTEM AND METHOD TO DETECT FLAME ROD/SENSOR MALFUNCTION

(71) Applicant: Carrier Corporation, Palm Beach Gardens, FL (US)

(72) Inventors: Kanna Selvakani, Telangana (IN); Manu Natesan, Telangana (IN); Aditya Kumar, Telangana (IN)

(73) Assignee: FIREYE, LLC, Derry, NH (US)

( * ) Notice: Subject to any disclaimer, the term of this patent is extended or adjusted under 35 U.S.C. 154(b) by 527 days.

(21) Appl. No.: 18/146,694

(22) Filed: Dec. 27, 2022

(65) Prior Publication Data

US 2023/0204210 A1 Jun. 29, 2023

Related U.S. Application Data

(60) Provisional application No. 63/293,976, filed on Dec. 27, 2021.

(51) Int. Cl.
*F23N 5/24* (2006.01)
*G01N 27/04* (2006.01)
*G01N 27/20* (2006.01)

(52) U.S. Cl.
CPC ........... *F23N 5/242* (2013.01); *G01N 27/041* (2013.01); *F23N 2227/16* (2020.01); *F23N 2229/12* (2020.01); *G01N 27/20* (2013.01)

(58) Field of Classification Search
CPC .. G01N 27/041; G01N 27/20; F23N 2229/12; F23N 5/123; F23N 2223/08; F23N 2229/08; F23N 1/022; F23N 2223/54; F23N 2227/16; F23N 2229/22; F23N 2231/10; F23N 2233/08; F23N 3/082; F23N 5/082; F23N 5/12; F23N 5/143; F23N 5/18; F23N 5/24; F23N 5/242
See application file for complete search history.

(56) References Cited

U.S. PATENT DOCUMENTS

| | | | |
|---|---|---|---|
| 10,132,770 B2 * | 11/2018 | Branecky | G01N 27/20 |
| 2012/0259205 A1 * | 10/2012 | Peyman | A61N 7/00 600/420 |

FOREIGN PATENT DOCUMENTS

| | | | | |
|---|---|---|---|---|
| DE | 102019106552 A1 * | 9/2019 | | A47J 37/0786 |

* cited by examiner

*Primary Examiner* — Kristina M Deherrera
*Assistant Examiner* — Gedeon M Kidanu
(74) *Attorney, Agent, or Firm* — CANTOR COLBURN LLP

(57) ABSTRACT

A method of monitoring a flame rod of a furnace including: detecting an average current of the flame rod during a burn cycle of the furnace; determining a burn time of the burn cycle of the furnace; and determining a remaining life of the flame rod based on at least the average current and the burn time.

18 Claims, 4 Drawing Sheets

700

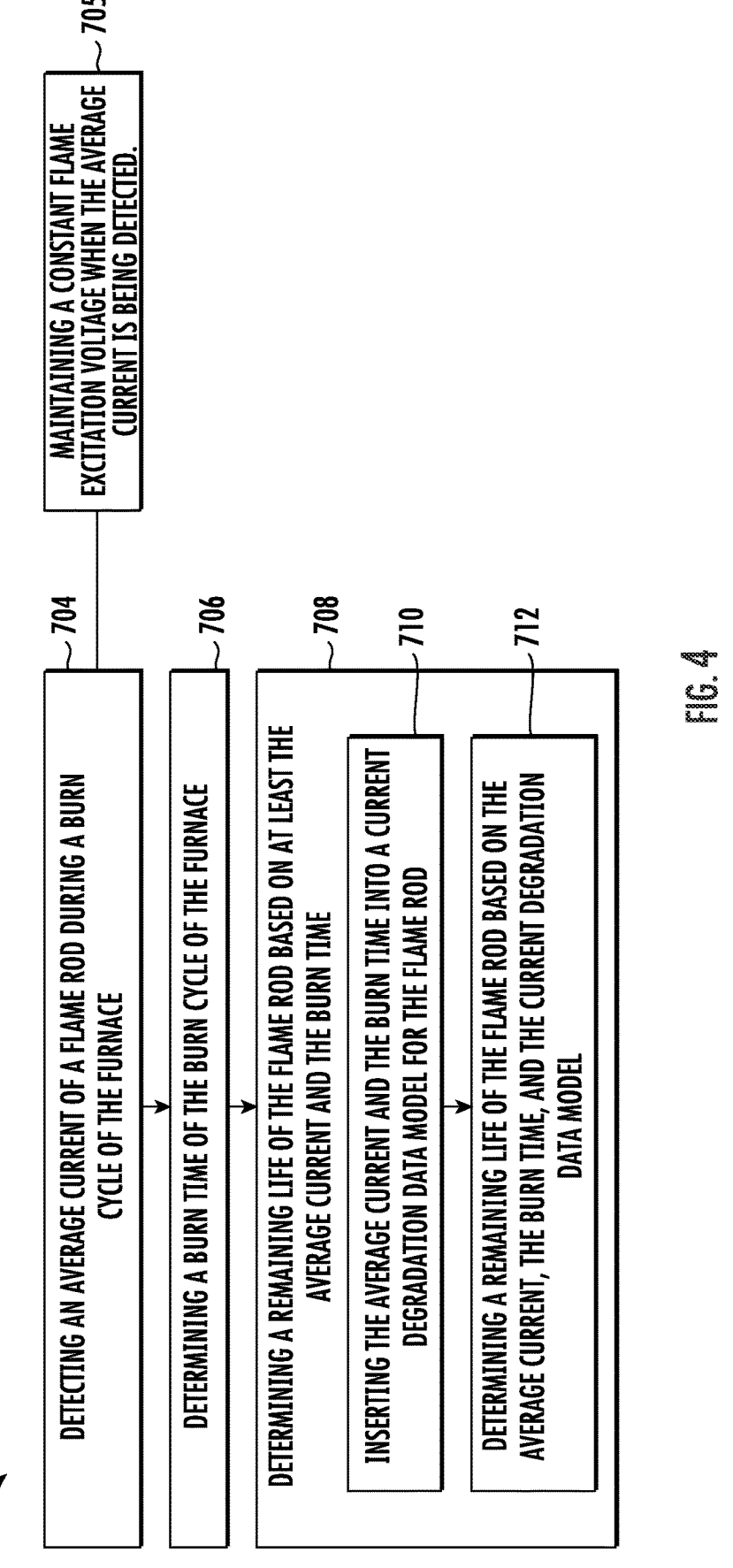

704 — DETECTING AN AVERAGE CURRENT OF A FLAME ROD DURING A BURN CYCLE OF THE FURNACE

705 — MAINTAINING A CONSTANT FLAME EXCITATION VOLTAGE WHEN THE AVERAGE CURRENT IS BEING DETECTED.

706 — DETERMINING A BURN TIME OF THE BURN CYCLE OF THE FURNACE

708 — DETERMINING A REMAINING LIFE OF THE FLAME ROD BASED ON AT LEAST THE AVERAGE CURRENT AND THE BURN TIME

710 — INSERTING THE AVERAGE CURRENT AND THE BURN TIME INTO A CURRENT DEGRADATION DATA MODEL FOR THE FLAME ROD

712 — DETERMINING A REMAINING LIFE OF THE FLAME ROD BASED ON THE AVERAGE CURRENT, THE BURN TIME, AND THE CURRENT DEGRADATION DATA MODEL

SYSTEM AND METHOD TO DETECT FLAME ROD/SENSOR MALFUNCTION

CROSS-REFERENCE TO RELATED APPLICATIONS

This application claims the benefit of U.S. Provisional Application No. 63/293,976, filed Dec. 27, 2021, all of which are incorporated herein by reference in their entirety.

BACKGROUND

The embodiments herein generally relate to furnaces and more specifically to a system and method for monitoring a flame rod.

Furnaces utilize a flame rod to detect the presence of a flame within the furnace.

BRIEF DESCRIPTION

According to one embodiment, a method of monitoring a flame rod of a furnace is provided. The method including: detecting an average current of the flame rod during a burn cycle of the furnace; determining a burn time of the burn cycle of the furnace; and determining a remaining life of the flame rod based on at least the average current and the burn time.

In addition to one or more of the features described above, or as an alternative, further embodiments may include maintaining a constant flame excitation voltage when the average current is being detected.

In addition to one or more of the features described above, or as an alternative, further embodiments may include transmitting the remaining life to a computing device; and activating an alarm on the computing device in response to the remaining life.

In addition to one or more of the features described above, or as an alternative, further embodiments may include activating a status light on the furnace based on the remaining life of the flame rod; or displaying a notification on a status display screen of the furnace based on the remaining life of the flame rod.

In addition to one or more of the features described above, or as an alternative, further embodiments may include transmitting the remaining life to a controller of the furnace.

In addition to one or more of the features described above, or as an alternative, further embodiments may include that determining the remaining life of the flame rod based on at least the average current and the burn time further includes: inserting the average current and the burn time into a current degradation data model for the flame rod; and determining the remaining life of the flame rod based on the average current, the burn time, and the current degradation data model.

In addition to one or more of the features described above, or as an alternative, further embodiments may include that the current degradation data model is a data analytics linear regression algorithm that depicts how a measured electrical current of the flame rod degrades over time.

According to another embodiment, a flame rod monitoring system for monitoring a flame rod of a furnace is provided. The flame rod monitoring system including: a processor; and a memory including computer-executable instructions that, when executed by the processor, cause the processor to perform operations, the operations including: detecting an average current of the flame rod during a burn cycle of the furnace; determining a burn time of the burn cycle of the furnace; and determining a remaining life of the flame rod based on at least the average current and the burn time.

In addition to one or more of the features described above, or as an alternative, further embodiments may include that the operations further include: maintaining a constant flame excitation voltage when the average current is being detected.

In addition to one or more of the features described above, or as an alternative, further embodiments may include that the operations further include: transmitting the remaining life to a computing device; and activating an alarm on the computing device in response to the remaining life.

In addition to one or more of the features described above, or as an alternative, further embodiments may include that the operations further include: activating a status light on the furnace based on the remaining life of the flame rod; or displaying a notification on a status display screen of the furnace based on the remaining life of the flame rod.

In addition to one or more of the features described above, or as an alternative, further embodiments may include that the operations further include: transmitting the remaining life to a controller of the furnace.

In addition to one or more of the features described above, or as an alternative, further embodiments may include that determining the remaining life of the flame rod based on at least the average current and the burn time further includes: inserting the average current and the burn time into a current degradation data model for the flame rod; and determining the remaining life of the flame rod based on the average current, the burn time, and the current degradation data model.

In addition to one or more of the features described above, or as an alternative, further embodiments may include that the current degradation data model is a data analytics linear regression algorithm that depicts how a measured electrical current of the flame rod degrades over time.

According to another embodiment, a computer program product tangibly embodied on a non-transitory computer readable medium is provided. The computer program product including instructions that, when executed by a processor, cause the processor to perform operations including: detecting an average current of a flame rod during a burn cycle of the furnace; determining a burn time of the burn cycle of a furnace; and determining a remaining life of the flame rod based on at least the average current and the burn time.

In addition to one or more of the features described above, or as an alternative, further embodiments may include that the operations further include: maintaining a constant flame excitation voltage when the average current is being detected.

In addition to one or more of the features described above, or as an alternative, further embodiments may include that the operations further include: transmitting the remaining life to a computing device; and activating an alarm on the computing device in response to the remaining life.

In addition to one or more of the features described above, or as an alternative, further embodiments may include that the operations further include: activating a status light on the furnace based on the remaining life of the flame rod; or displaying a notification on a status display screen of the furnace based on the remaining life of the flame rod.

In addition to one or more of the features described above, or as an alternative, further embodiments may include that the operations further include: transmitting the remaining life to a controller of the furnace.

In addition to one or more of the features described above, or as an alternative, further embodiments may include that determining the remaining life of the flame rod based on at least the average current and the burn time further includes: inserting the average current and the burn time into a current degradation data model for the flame rod; and determining the remaining life of the flame rod based on the average current, the burn time, and the current degradation data model.

Technical effects of embodiments of the present disclosure include monitoring degradation of a flame rod by detecting an average electrical current through the flame rod.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike:

FIG. 4 is a flowchart illustrating a method of monitoring a flame rod of a furnace, according to an embodiment of the present disclosure.

DETAILED DESCRIPTION

A detailed description of one or more embodiments of the disclosed apparatus and method are presented herein by way of exemplification and not limitation with reference to the Figures.

Flame rods may be utilized in furnaces and other devices to detect the presence of a flame. Flame rods may begin to degrade over time, which may inhibit their ability to detect a flame. Degradation may be measured through electrical current measurements of the flame rod. Current measurement can differ gradually when there is corrosion which is building up over the surface of flame rod and may also depend upon air quality where system is placed.

Embodiments disclosed herein seek to continuously monitor or intermittently monitor current measurements of the flame rod to better predict degradation of the flame rod.

Figure 1:
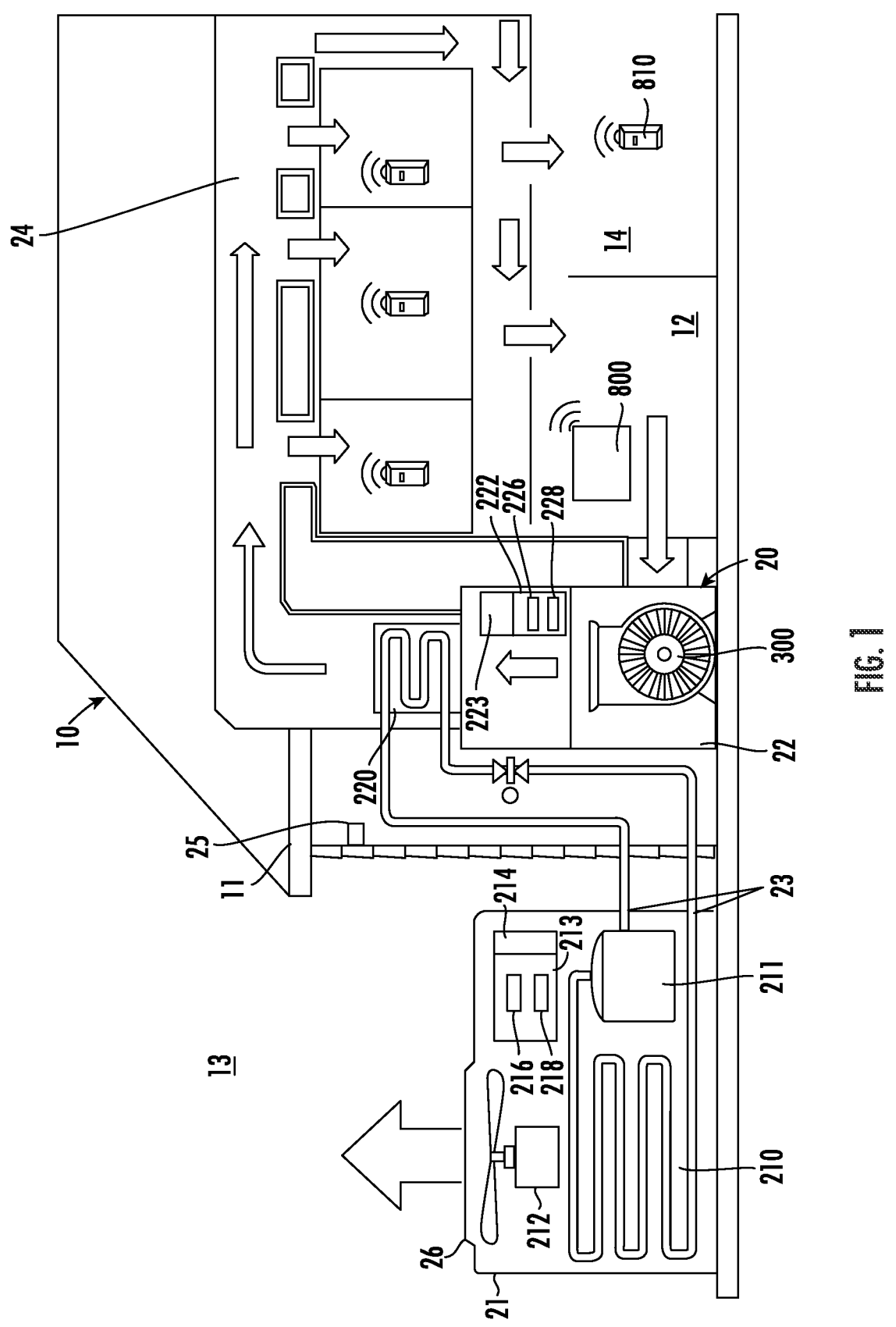
FIG. 1 is a perspective view of an exemplary heating, ventilation and air-conditioning (HVAC) system, according to an embodiment of the present disclosure.

FIG. 1 is schematic view of a structure 10 and an HVAC system 20 for the structure 10, according to an embodiment of the present disclosure. The structure 10 may be configured as a residence, an industrial building, or a commercial building. For purposes of clarity and brevity, however, the following description will relate to the case where the structure 10 is configured as a single-family residence. The structure 10 thus includes a structural body 11 which defines an interior 12 and separates the interior 12 from an exterior 13. The interior 12 may be further divided into multiple rooms 14 and areas for various purposes.

The structure 10 includes an HVAC system 20 disposed and configured to control environmental conditions within the interior 12. The HVAC system 20 includes one or more of an outdoor unit 21 and an indoor unit 22. The outdoor unit 21 is disposed at the exterior 13 of the structural body 11 and the indoor unit 22 is disposed in the interior 12.

As shown in FIG. 1, the outdoor unit 21 includes a condenser coil 210, a compressor 211, a fan 212 and, in some cases, an outdoor controller 213, and a first wireless transceiver 214. The first wireless transceiver 214 may be in wireless communication with a thermostat 800. Alternatively, the outdoor unit 21 may be in wired communication with the thermostat 800. The outdoor controller 213 may be an electronic controller including a processor 216 and an associated memory 218 comprising computer-executable instructions (i.e., computer program product) that, when executed by the processor 216, cause the processor 216 to perform various operations. The processor 216 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 218 may be but is not limited to a random access memory (RAM), read only memory (ROM), or other electronic, optical, magnetic or any other computer readable medium.

As shown in FIG. 1, the indoor unit 22 includes an indoor coil 220, a furnace 300 and, in some cases, an indoor controller 222 and a second wireless transceiver 223. The second wireless transceiver 223 may be in wireless communication with a thermostat 800. Alternatively, the indoor unit 22 may be in wired communication with the thermostat 800. The second wireless transceiver 223 may also be in wireless communication with the first wireless transceiver 214. The indoor controller 222 may be an electronic controller including a processor 226 and an associated memory 228 comprising computer-executable instructions (i.e., computer program product) that, when executed by the processor 226, cause the processor 226 to perform various operations. The processor 226 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 228 may be but is not limited to a random access memory (RAM), read only memory (ROM), or other electronic, optical, magnetic or any other computer readable medium.

Refrigeration lines 23 are provided to connect the outdoor unit 21 with the indoor unit 22 and ducts 24 are provided throughout the interior 12 such that heated or cooled air can be transported from the indoor unit 22 to the various areas in the interior 12. It is understood that while FIG. 1 illustrated a particular arrangement of ducts 24, the embodiments disclosed herein may apply to any arrangement of ducts 24.

In some cases, the components of the outdoor unit 21 and the indoor unit 22 may be included in a single unit that can be disposed at the exterior 13 of the structural body 11 or in the interior 12. For example, the components of the indoor unit 22 may be included in the outdoor unit 21 and disposed at the exterior 13. Conversely, the components of the outdoor unit 21 may be included in the indoor unit 22 and disposed in the interior 12. Still other embodiments exist in which the components of the outdoor unit 21 and indoor unit 22 are included in a single device which is partially disposed at the exterior 13 and partially disposed in the interior 12 (e.g., a window air-conditioning unit or wall air conditioning unit).

The HVAC system 20 may further include one or more sensors 810, such as temperature sensors, that are distributed throughout the interior 12 and possibly at the exterior 13. The sensors 810 are in wireless or wired communication with the thermostat 800, a further discussed herein. The thermostat 800 is generally accessible to an individual and is configured to control various operations of the outdoor unit 21 and indoor unit 22 to maintain desired environmental conditions in the interior 12 in accordance with at least readings of the one or more sensors 810 and with commands input by a user.

The thermostat 800 may have the capability to establish and maintain wireless connectivity over one or more networks (e.g., Wi-Fi, Bluetooth, Z-Wave, Zigbee, etc.). The thermostat 800 can therefore be connected to a homeowner's Wi-Fi network and the Internet. This allows the thermostat 800 to have additional features and capabilities including, but not limited to, being remotely controllable by a user using a portable computing device (e.g., a mobile phone, a tablet, a laptop, etc.).

Figure 2:
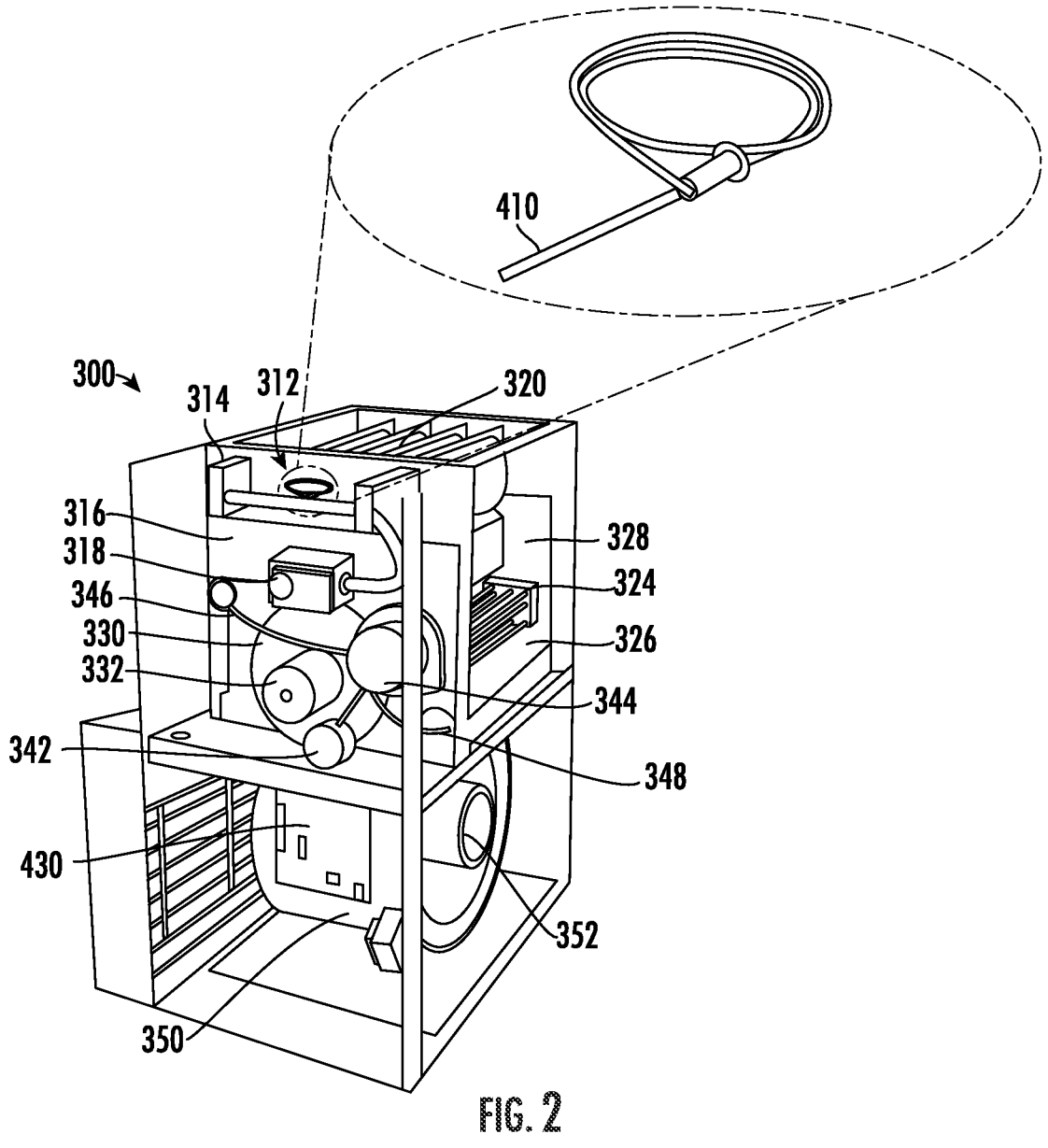
FIG. 2 is a cutaway perspective view of a furnace of the HVAC system that may be used in the HVAC system of FIG. 1, according to an embodiment of the present disclosure.

Referring now to FIG. 2, with continued reference to FIG. 1, a perspective cutaway view of a conventional two-stage condensing furnace 300 is illustrated, according to an embodiment of the present disclosure.

The furnace 300 may include a burner assembly 312, a burner box 314, an air supply duct 316, and a gas valve 318. The burner assembly 312 may be located within the burner box 314 and may be supplied with air through the air supply duct 316. The burner assembly 312 includes a flame rod 410 configured to detect a flame in the burner box 314. Fuel gas may be supplied to the burner assembly 312 through the gas valve 318, and fuel may be ignited by an igniter assembly (not shown). The gas valve 318 may comprise a conventional solenoid-operated two-stage gas valve. The gas valve 318 for the two-stage furnace may have a closed state, a high open state associated with the operation of furnace 300 at its high firing rate, and a low open state associated with the operation of furnace 300 at its low firing rate.

The furnace 300 may include a heat exchanger assembly, which may include a plurality of heat exchangers including a primary or non-condensing heat exchanger 320 and a secondary or condensing heat exchanger 324. The furnace 300 may further include a condensate collector box 326, an exhaust vent 328, an induced draft blower 330, and an inducer motor 332 operably connected to the induced draft blower 330. The inducer motor 332, one of a plurality of motors in the furnace 300, may drive the induced draft blower 330. The inducer motor 332 may be operable or configured to drive the induced draft blower 330. Gases produced by combustion within the burner box 314 may flow through the plurality of heat exchangers, the condensate collector box 326 and may then be vented to the atmosphere through the exhaust vent 328. The flow of these gases, alternatively referred to as combustion gases, may be maintained by the induced draft blower 330.

The two-stage furnace 300 may further include a thermostat 800, a plurality of pressure switches including a low pressure switch 342 and a high pressure switch 344, and a plurality of pressure tubes including a first pressure tube 346 and a second pressure tube 348. Excess air levels in the furnace 300 may be kept within an acceptable lower limit in part by the low pressure switch 342. Excess air levels in the furnace 300 may be kept within an acceptable higher limit in part by the high pressure switch 344. To sense pressure at the inlet of the primary heat exchanger 320, the plurality of pressure switches may be connected to the burner box 314 through a pressure tube 346. To sense pressure at the outlet of the secondary heat exchanger 324, the plurality of pressure switches 342 and 344 may be connected to collector box 326 through the pressure tube 348.

The furnace 300 may further include a blower 350 and a blower motor 352 operably connected to the blower 350. The blower motor 352, another of the plurality of motors in the furnace 300, may drive the blower 350. The blower motor 352 may be operable or configured to drive the blower 350. The blower 350 may draw in air, and air discharged from the blower 350, alternatively referred to as circulating air flow, and may then pass over the plurality of heat exchangers in a counter-flow relationship to the flow of combustion air. The circulating airflow may be thereafter directed to a space to be heated through a duct system (not shown).

The plurality of motors (e.g., inducer motor 332 and blower motor 352) may operate at a low speed when the furnace 300 is operating at its low firing rate (low stage operation). The plurality of motors may operate at a high speed when the furnace 300 is operating at its high firing rate (high stage operation). The plurality of motors may be designed to operate at continuously variable speeds. Alternatively, for the two-stage furnace 300 the plurality of motors may be designed to selectively operate and at a plurality of operating speeds including a steady state low operating speed and a steady state high operating speed.

The furnace 300 may include a controller 430 that, in part, may selectively control the operating speed of the plurality of motors by generating and transmitting control signals. For example, depending on operating conditions, the controller 430 may select a speed from the plurality of operating speeds for the plurality of motors. In addition, the controller 430 may select a time, duration, ramp rate, and torque at which the plurality of motors accelerate to and decelerate from the selected speed. The controller 430 may be electrically connected to the flame rod 410 and in communication with the flame rod 410 to receive data from the flame rod.

The combustion efficiency of an induced-draft gas-fired furnace may be optimized by maintaining the proper ratio of the gas input rate and the combustion airflow rate. Generally, the ideal ratio may be offset somewhat for safety purposes by providing for slightly more combustion air (that is, excess air) than that required for optimum combustion efficiency. While FIG. 2 illustrates a condensing furnace (that is, a furnace that uses a heat exchanger assembly that includes primary and secondary heat exchangers), the accompanying disclosure may be also applicable to non-condensing furnaces (that is, furnaces that have heat exchanger assemblies with only a single heat exchanger unit), and packaged units (a furnace and air conditioner/heat pump combination in a single enclosure).

In the following sample use cases, the controller 430 may determine the requirements from the low pressure switch 342 and high pressure switch 344 in response to call-for-heat signals received from the thermostat 800 located in the space to be heated. From this determination the controller 430 may generate speed control signals to drive the inducer motor 332.

In a first sample use case, when the thermostat 800 provides a call-for-heat signal to the controller 430, the controller 430 may determine that furnace 300 is to operate at the low firing rate. The controller 430 may accelerate the inducer motor 332 to a first pre-ignition speed. The first pre-ignition speed for the inducer motor 332 may be a first pre-ignition steady state speed that may corresponding to a first pre-ignition differential pressure for the heat exchanger assembly. The first pre-ignition differential pressure for the heat exchanger assembly may be sufficient to actuate the low pressure switch 342, but not the high pressure switch 344.

When the first differential pressure for the heat exchanger assembly has been sustained for a preset time, the gas valve 318 may actuate to its low open state. Under this condition, the gas valve 318 may supply gas at the low firing rate to the burner assembly 312. The gas is ignited and begins heating the combustion gases passing through the heat exchanger assembly. This heating may cause a change in the density of the combustion air which, in turn, may causes an increase in the differential pressure across the heat exchange assembly.

The speed of the inducer motor 332 may be then reduced to a first post-ignition speed. The first post-ignition speed for the inducer motor 332 is a first post-ignition steady state speed that corresponds to a first post ignition differential pressure for the heat exchanger assembly. The first post-ignition differential pressure for the heat exchanger assembly is somewhat lower than the first pre-ignition value.

After reducing the speed of inducer motor 332 to the first post-ignition speed, controller 430 may provide a signal that causes blower motor 352 to accelerate to a first post-ignition speed. The first post-ignition speed for the blower motor 352 may be a first steady state speed that corresponds to a circulating airflow at which the furnace 300 may be designed to operate during low stage operations.

In a second sample use case, when the thermostat 800 provides a call-for-heat signal to controller 430, the controller 430 may determine that furnace 300 is to operate at the high firing rate. The controller 430 may accelerate the inducer motor 332 to a second pre-ignition speed. The second pre-ignition speed for the inducer motor 332 may be a second pre-ignition steady state speed that may correspond to a second pre-ignition differential pressure for the heat exchanger assembly. The second pre-ignition speed for the inducer motor 332 may be sufficient to actuate both low pressure switch 342 and high pressure switch 344.

When the second pre-ignition differential pressure for the heat exchanger assembly has been sustained for a preset time, the gas valve 318 may be actuated to the high open state. Under this condition, the gas valve 318 may supply gas at the high firing rate to burner assembly 312. The gas may be ignited and begin heating the combustion gases passing through the heat exchanger assembly. This heating may cause a change in the density of the combustion gases which, in turn, may cause an increase in the differential pressure across the heat exchange assembly.

The speed of inducer motor 332 may then be increased (rather than decreased as in the first sample use case) to a second post-ignition speed to attain a second post-ignition steady state speed. The second post-ignition steady state speed may correspond to a second post-ignition differential pressure for the heat exchanger assembly that is somewhat higher than the pre-ignition value. After moving the speed of inducer motor 332 to the second post-ignition speed, controller 430 may cause blower motor 352 to accelerate to a second blower motor speed. The second post-ignition speed for the blower motor 352 is may be a second steady state speed that may correspond to the circulating airflow value at which furnace 300 is designed to operate.

In order to reduce the operating cost of furnace 300 by improving its annual fuel utilization efficiency (AFUE), the combustion airflow for furnace 300 may be adapted to provide for intermediate stages of operation between the low stage of operation and the high stage of operation. This may be accomplished by providing one or more additional pressure switches that actuate at heat exchanger pressure levels intermediate that of the plurality of pressure switches. Circuitry in the controller 430, however, may be limited to two inputs on which the plurality of pressure switches may provide pressure signals related to the pressure in the heat exchanger assembly.

Figure 3:
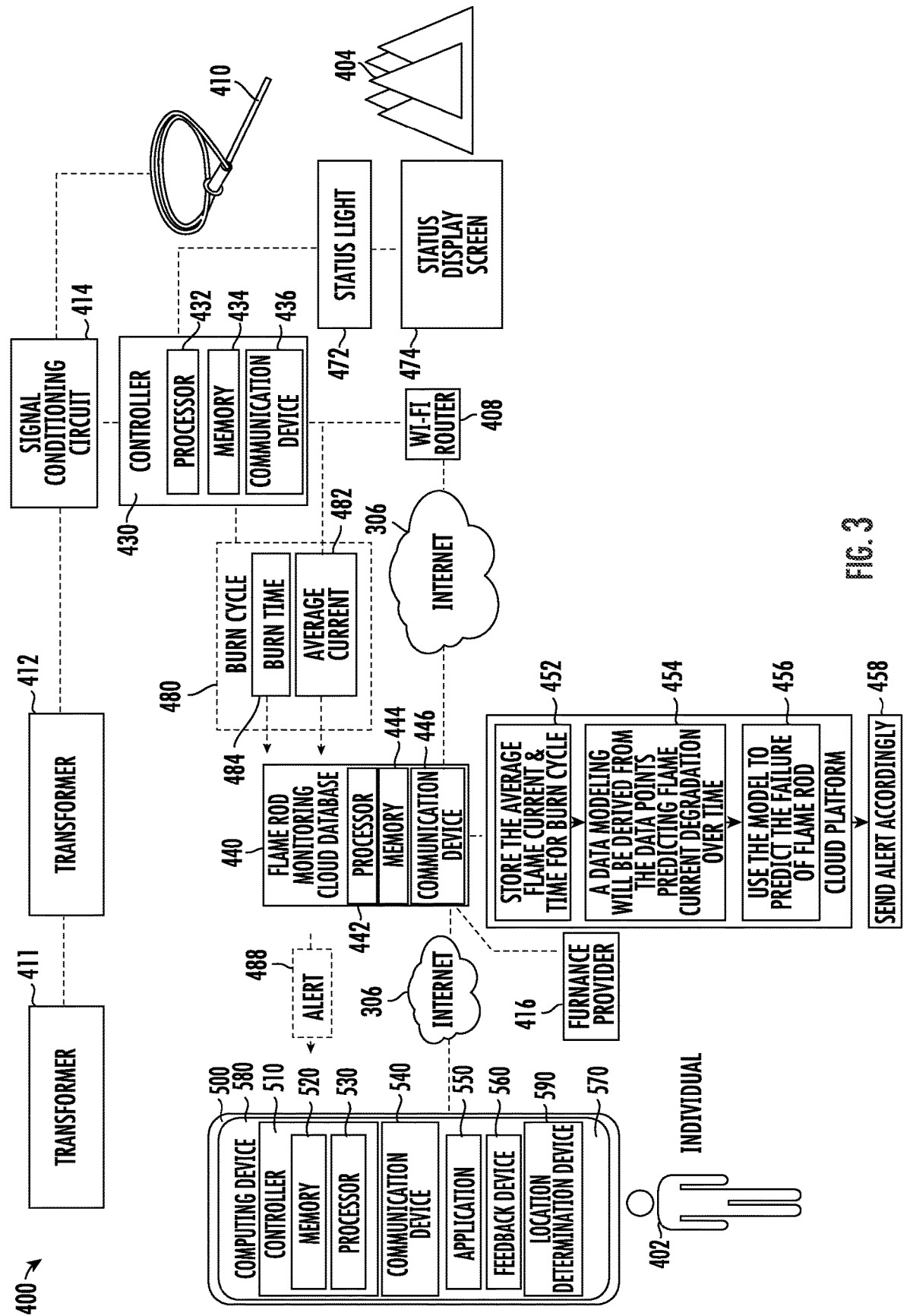
FIG. 3 is a schematic view of a flame rod monitoring system, according to an embodiment of the present disclosure.

Referring now to FIG. 3, a schematic diagram of a flame rod monitoring system 400 is illustrated, according to an embodiment of the present disclosure. It should be appreciated that, although particular systems are separately defined in the schematic block diagrams, each or any of the systems may be otherwise combined or separated via hardware and/or software.

The flame rod monitoring system 400 includes a flame rod cloud database 440, a flame rod 410, and a computer application 550 installed or accessible on a computing device 500 such as, for example, a software-as-as service or a website. The computer application 550 may be in communication with the cloud database via the internet 406. It is understood, that while only one flame rod 410 is illustrated for the furnace 300, the furnace 300 may have one or more flame rods 410.

The flame rod 410 is configured to detect the presence of a flame 404 in the furnace 300. The flame rod 410 is configured to communicate the presence of the flame 404 to the controller 430. The flame rod 410 may be configured to detect the flame 404 based on a current measured by the controller 430. Current is supplied from a power supply 411 to a transformer 412 to a signal conditioning circuit 414 and then to the flame rod 410. The power supply 411 may be an alternating current power source.

The controller 430 is configured to measure an average current 482 drawn by the flame rod 410 during a flame burn cycle 480 of the furnace 300 and track the burn time 484 of the flame burn cycle 480. The average current 482 may be measured at the signal conditioning circuit 414. A constant flame excitation voltage may be maintained by the signal conditioning circuit 414 when the average current 482 is being detected. The flame excitation voltage is the output voltage of the transformer 412, which is applied across the flame rod 410. Constant excitation voltage helps in removing supply voltage variation induced drift/variation in the flame current measurement. The signal conditioning circuit 414 also converts the flame current to voltage.

The measurement of the average current 482 and burn time 484 may take place when ignition control in burn mode and has full strength of flame. If the flame current is above a threshold limit then it is referred to as full flame strength. The controller 430 is configured to transmit the average current 482 and the burn time 484 to the flame rod monitoring cloud database 440. The flame rod monitoring cloud database 440 is configured to store the average current 482 and the burn time 484 of each burn cycle 480 at block 452. The flame burn cycle 480 may be defined by a time for which flame is present or a time for which the thermostat 800 is high. Each of the average current 482 and the burn time 484 for each burn cycle 480 may be timestamped with a time and date of the burn cycle 480.

The flame rod monitoring cloud database 440 includes a current degradation data model 454 that is derived from data points to predict current degradation over time. Alternatively, the current degradation data model 454 may be installed in the furnace 300. The current degradation data model 454 may be installed in the controller 430 of the furnace 300 to perform analytics locally.

The current degradation data model 454 may be a data analytics linear regression algorithm that depicts how a measured electrical current of the flame rod 410 degrades over time. The flame rod monitoring system 400 is configured to track the average current 482 and burn time of each burn cycle 480 in the current degradation data model 454 to predict future flame current degradation over time at block 456. From the delta difference with reference to time, data analytics (linear regression) algorithm will run and predict the period/month to do service if delta value reaches the threshold (reference algorithm image). Thresholds for degradation will be calculated based on historical data of flame rod degradation.

The flame rod monitoring cloud database 440 may be configured to transmit an alert 488 at block 458. The alert 488 may include remaining life level of the flame rod 410. The remaining life level may be a prediction of how much time a flame rod 410 has until it has degraded beyond a point where it is reasonably usable or how many more burn cycles 480 the flame rod 410 has until it has degraded beyond a point where it is reasonably usable. The alert 488 may alert the individual 402 about the degradation of the flame rod 410 or notifying that it is time to service the flame rod 410.

The alert 488 may be configured to alert an individual 402 to the remaining life of the flame rod 410 and/or may indicate a need for maintenance. The alert 388 may be displayed on the display device 580 of the computing device 500 and/or may activate a sound or vibration of the feedback device 560 of the computing device 500. The individual 402 may be in possession of the computing device 500. The individual 402 may be a person, an organization, a group, a partnership, a company, or a corporation. The individual 402 may be a maintenance person or a customer/owner of the furnace 300.

The alert 488 may also be transmitted back to the controller 430 of the furnace 300 to activate a status light 772 (e.g., LED) on the furnace 300 and/or display a notification on a status display screen 474 of the furnace 300.

The controller 430 may be an electronic controller including a processor 432 and an associated memory 434 comprising computer-executable instructions (i.e., computer program product) that, when executed by the processor 432, cause the processor 432 to perform various operations. The processor 432 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 434 may be but is not limited to a random access memory (RAM), read only memory (ROM), or other electronic, optical, magnetic or any other computer readable medium.

The controller 430 also includes a communication device 436. The communication device 436 may be capable of wireless communication including but not limited to Wi-Fi, Bluetooth, Ultra-Wideband, Zigbee, Sub-GHz RF Channel, cellular, satellite, near-field communication (NFC), or any other wireless signal known to one of skill in the art. The communication device 436 may be configured to communicate with the flame rod cloud database 440 through the internet 406. The communication device 436 may be configured to communicate with the flame rod cloud database 440 through the internet 406 through a local Wi-Fi router 408. Alternatively, or additionally, the communication device 436 may be configured to communicate directly with the flame rod cloud database 440.

The flame rod cloud database 440 may belong to and/or be managed by a furnace provider 416, such as, for example a manufacture of the flame rod 410 or an aftermarket support company for the flame rod 410.

The flame rod cloud database 440 may be a database to control and coordinate the service provided by the furnace provider 416 and communication/alerts 488 from the flame rod 410. The furnace provider 416 may be a person, an organization, a group, a partnership, a company, or a corporation. The furnace provider 416 may be the manufacture of the overall furnace 300.

The flame rod cloud database 440 may be a remote computer server that includes a processor 442 and an associated memory 444 comprising computer-executable instructions (i.e., computer program product) that, when executed by the processor 442, cause the processor 442 to perform various operations. The processor 442 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 444 may be but is not limited to a random access memory (RAM), read only memory (ROM), or other electronic, optical, magnetic or any other computer readable medium.

The flame rod cloud database 440 also includes a communication device 446. The communication device 446 may be capable of hared wired communication or wireless communication including but not limited to Wi-Fi, Bluetooth, Ultra-Wideband, Zigbee, Sub-GHz RF Channel, cellular, satellite, or any other wireless signal known to one of skill in the art. The communication device 446 may be configured to communicate with the computing device 500 and the controller 430 of the furnace 300 through the internet 406. This communication may occur through local Wi-Fi routers 408, a satellite connection, a cellular connection, hardline connection, or any other internet connection method known to one of skill in the art.

The computing device 500 may be a desktop computer, a laptop computer, or a mobile computing device that is typically carried by a person, such as, for example a phone, a smart phone, a PDA, a smart watch, a tablet, a laptop, or any other mobile computing device known to one of skill in the art.

The computing device 500 includes a controller 510 configured to control operations of the computing device 500. The controller 510 may be an electronic controller including a processor 530 and an associated memory 520 comprising computer-executable instructions (i.e., computer program product) that, when executed by the processor 530, cause the processor 530 to perform various operations. The processor 530 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 520 may be but is not limited to a random access memory (RAM), read only memory (ROM), or other electronic, optical, magnetic or any other computer readable medium.

The computing device 500 includes a communication device 540 configured to communicate with the internet 406 through one or more wireless signals. The one or more wireless signals may include Wi-Fi, Bluetooth, Ultra-Wideband, Zigbee, Sub-GHz RF Channel, cellular, satellite, or any other wireless signal known to one of skill in the art. The computing device 500 is configured to communicate with the flame rod cloud database 440 through the internet 406. Alternatively, the computing device 500 may be connected to the internet 406 through a hardwired connection.

The computing device 500 may include a display device 580, such as for example a computer display, an LCD display, an LED display, an OLED display, a touchscreen of a smart phone, tablet, or any other similar display device known to one of the skill in the art. A user operating the computing device 500 is able to view the computer application 550 through the display device 580.

The computing device 500 includes an input device 570 configured to receive a manual input from a user (e.g., human being) of computing device 500. The input device 570 may be a keyboard, a touch screen, a joystick, a knob, a touchpad, one or more physical buttons, a microphone configured to receive a voice command, a camera or sensor configured to receive a gesture command, an inertial measurement unit configured to detect a shake of the computing device 500, or any similar input device known to one of skill in the art. The user operating the computing device 500 is able to enter data into the computer application 550 through the input device 570. The input device 570 allows the user operating the computing device 500 to data into the computer application 550 via a manual input to input device 570. For example, the user may respond to a prompt on the display device 580 by entering a manual input via the input device 570. In one example, the manual input may be a touch on the touchscreen. In an embodiment, the display device 580 and the input device 570 may be combined into a single device, such as, for example, a touchscreen.

The computing device 500 may also include a feedback device 560. The feedback device 560 may activate in response to a manual input via the input device 570. The feedback device 560 may be a haptic feedback vibration device and/or a speaker emitting a sound. The feedback device 560 may activate to confirm that the manual input entered via the input device 570 was received via the computer application 550. For example, the feedback device 560 may activate by emitting an audible sound or vibrate the computing device 500 to confirm that the manual input entered via the input device 570 was received via the computer application 550.

The computing device 500 may also include a location determination device 590 that may be configured to determine a location of the computing device 500 using cellular signal triangulation, a global position satellite (GPS), or any location termination method known to one of skill in the art.

Referring now to FIG. 4, with continued reference to FIGS. 1-3, a flow chart of a method 700 of monitoring a flame rod 410 of a furnace 300 is illustrated, according to an embodiment of the present disclosure.

At block 704, an average current 782 of a flame rod 410 during a burn cycle 480 of the furnace 300 is detected. At block 705, the method 700 may further include that a constant flame excitation voltage is maintained when the average current 482 is being detected in block 704. The constant flame excitation voltage may be maintained by the signal conditioning circuit 414.

At block 706, a burn time 784 of the burn cycle 480 of the furnace 300 is determined.

At block 708, a remaining life of the flame rod 410 is determined based on at least the average current 782 and the burn time 784. Block 708 may be composed of block 710 and block 712.

At block 710, the average current 782 and the burn time 784 are inserted into a current degradation data model 454 for the flame rod 410. The current degradation data model 454 is a data analytics linear regression algorithm that depicts how a measured electrical current of the flame rod 410 degrades over time. The current degradation data model 454 may be based on historical data of the flame rod 410 and/or test data of the flame rod 410.

At block 712, a remaining life of the flame rod 410 is determined based on the average current 782, the burn time 784, and the current degradation data model 454.

The method 700 may further include that the remaining life is transmitted to a computing device 500. The remaining life may be transmitted as an alert 488, see FIG. 3. An alarm may be activated on the computing device 500 in response to the remaining life.

The method 700 may further include that a status light 472 is activated on the furnace 300 based on the remaining life of the flame rod 410 and/or a notification is displayed on a status display screen 474 of the furnace 300 based on the remaining life of the flame rod 410.

The method 700 may be performed by the controller 430 of the furnace 300 and/or by the flame rod monitoring cloud database 440. The remaining life may be transmitted from the flame rod monitoring cloud database 440 to the controller 430. The remaining life may be transmitted as an alert 488 from the flame rod monitoring cloud database 440 to the controller 430. The remaining life may be transmitted from controller 430 to the flame rod monitoring cloud database 440. The remaining life may be transmitted as an alert 488 from controller 430 to the flame rod monitoring cloud database 440.

While the above description has described the flow process of FIG. 4 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As described above, embodiments can be in the form of processor-implemented processes and devices for practicing those processes, such as processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of monitoring a flame rod of a furnace, the method comprising:

initiating a burn cycle of the furnace by igniting a fuel supplied to the furnace;

applying a flame excitation voltage across the flame rod;

detecting an average current of the flame rod during the burn cycle of the furnace, maintaining a constant flame excitation voltage across the flame rod when the average current is being detected;

determining a burn time of the burn cycle of the furnace; and determining a remaining life of the flame rod based on at least the average current and the burn time.

2. The method of claim 1, further comprising:

transmitting the remaining life to a computing device; and activating an alarm on the computing device in response to the remaining life.

3. The method of claim 1, further comprising:

activating a status light on the furnace based on the remaining life of the flame rod; or displaying a notification on a status display screen of the furnace based on the remaining life of the flame rod.

4. The method of claim 3, further comprising:

transmitting the remaining life to a controller of the furnace.

5. The method of claim 1, wherein determining the remaining life of the flame rod based on at least the average current and the burn time further comprises:

inserting the average current and the burn time into a current degradation data model for the flame rod; and determining the remaining life of the flame rod based on the average current, the burn time, and the current degradation data model.

6. The method of claim 5, wherein the current degradation data model is a data analytics linear regression algorithm that depicts how a measured electrical current of the flame rod degrades over time.

7. A flame rod monitoring system for monitoring a flame rod of a furnace, the flame rod monitoring system comprising:

a processor; and a memory comprising computer-executable instructions that, when executed by the processor, cause the processor to perform operations, the operations comprising:

initiating a burn cycle of the furnace by igniting a fuel supplied to the furnace;

applying a flame excitation voltage across the flame rod;

detecting an average current of the flame rod during the burn cycle of the furnace, maintaining a constant flame excitation voltage across the flame rod when the average current is being detected;

determining a burn time of the burn cycle of the furnace; and determining a remaining life of the flame rod based on at least the average current and the burn time.

8. The flame rod monitoring system of claim 7, wherein the operations further comprise:

transmitting the remaining life to a computing device; and activating an alarm on the computing device in response to the remaining life.

9. The flame rod monitoring system of claim 7, wherein the operations further comprise:

activating a status light on the furnace based on the remaining life of the flame rod; or displaying a notification on a status display screen of the furnace based on the remaining life of the flame rod.

10. The flame rod monitoring system of claim 9, wherein the operations further comprise:

transmitting the remaining life to a controller of the furnace.

11. The flame rod monitoring system of claim 7, wherein determining the remaining life of the flame rod based on at least the average current and the burn time further comprises:

inserting the average current and the burn time into a current degradation data model for the flame rod; and determining the remaining life of the flame rod based on the average current, the burn time, and the current degradation data model.

12. The flame rod monitoring system of claim 11, wherein the current degradation data model is a data analytics linear regression algorithm that depicts how a measured electrical current of the flame rod degrades over time.

13. A computer program product tangibly embodied on a non-transitory computer readable medium, the computer program product including instructions that, when executed by a processor, cause the processor to perform operations comprising:

initiating a burn cycle of the furnace by igniting a fuel supplied to the furnace;

applying a flame excitation voltage across the flame rod;

detecting an average current of a flame rod during the burn cycle of the furnace, maintaining a constant flame excitation voltage across the flame rod when the average current is being detected;

determining a burn time of the burn cycle of a furnace; and determining a remaining life of the flame rod based on at least the average current and the burn time.

14. The computer program product of claim 13, wherein the operations further comprise:

transmitting the remaining life to a computing device; and activating an alarm on the computing device in response to the remaining life.

15. The computer program product of claim 13, wherein the operations further comprise:

activating a status light on the furnace based on the remaining life of the flame rod; or displaying a notification on a status display screen of the furnace based on the remaining life of the flame rod.

16. The computer program product of claim 15, wherein the operations further comprise:

transmitting the remaining life to a controller of the furnace.

17. The computer program product of claim 13, wherein determining the remaining life of the flame rod based on at least the average current and the burn time further comprises:

inserting the average current and the burn time into a current degradation data model for the flame rod; and determining the remaining life of the flame rod based on the average current, the burn time, and the current degradation data model.

18. A furnace comprising:

a burner box;

a burner assembly located within the burner box;

a gas valve configured to supply fuel to the burner assembly;

a flame rod configured to detect a flame in the burner box;

a controller configured to perform operations comprising:

detecting an average current of the flame rod during a burn cycle of the furnace;

determining a burn time of the burn cycle of the furnace; and initiate determining a remaining life of the flame rod based on at least the average current and the burn time.

* * * * *